(12) United States Patent
Tai et al.

(10) Patent No.: US 7,793,241 B2
(45) Date of Patent: Sep. 7, 2010

(54) POWER NETWORK ANALYZER FOR AN INTEGRATED CIRCUIT DESIGN

(75) Inventors: Philip Hui-Yuh Tai, Cupertino, CA (US); Yi-Min Jiang, San Jose, CA (US); Sung-Hoon Kwon, Sunnyvale, CA (US)

(73) Assignee: SYNOPSYS, Inc., Mountain View, CA (US)

( * ) Notice: Subject to any disclaimer, the term of this patent is extended or adjusted under 35 U.S.C. 154(b) by 372 days.

(21) Appl. No.: 11/930,020

(22) Filed: Oct. 30, 2007

(65) Prior Publication Data

US 2008/0052649 A1    Feb. 28, 2008

Related U.S. Application Data

(62) Division of application No. 10/976,653, filed on Oct. 29, 2004, now Pat. No. 7,346,869.

(51) Int. Cl.
    *G06F 17/50* (2006.01)
(52) U.S. Cl. .................. 716/5; 716/7; 703/15
(58) Field of Classification Search ............... 716/5, 716/7; 703/15
    See application file for complete search history.

(56) References Cited

U.S. PATENT DOCUMENTS

| | | | |
|---|---|---|---|
| 4,726,991 A | 2/1988 | Hyatt et al. | |
| 4,811,237 A * | 3/1989 | Putatunda et al. | 716/9 |
| 5,598,348 A | 1/1997 | Rusu et al. | |
| 5,808,900 A | 9/1998 | Buer et al. | |
| 5,933,358 A | 8/1999 | Koh et al. | |
| 6,043,672 A | 3/2000 | Sugasawara | |
| 6,202,191 B1 | 3/2001 | Filippi et al. | |
| 6,202,196 B1 | 3/2001 | Huang et al. | |
| 6,223,328 B1 | 4/2001 | Ito et al. | |
| 6,308,307 B1 | 10/2001 | Cano et al. | |
| 6,311,147 B1 | 10/2001 | Tuan et al. | |
| 6,405,357 B1 | 6/2002 | Chao et al. | |
| 6,446,245 B1 | 9/2002 | Xing et al. | |
| 6,457,157 B1 | 9/2002 | Singh et al. | |
| 6,487,706 B1 | 11/2002 | Barkley et al. | |
| 6,493,859 B1 | 12/2002 | Gould et al. | |

(Continued)

OTHER PUBLICATIONS

Zhao, M. et al. "Optimal Placement of Power Supply Pads and Pins", (DAC), 2004, pp. 165-170.

(Continued)

*Primary Examiner*—Phallaka Kik
(74) *Attorney, Agent, or Firm*—Silicon Valley Patent Group LLP; Omkar Suryadevara

(57) ABSTRACT

A design of an integrated circuit device, in which locations of power wires and memory/logic circuitry are known, is analyzed by at least: identifying intersections of power wires with one another, for power wires that are electrically connected to one another through vias; segmenting power wires, at their intersections; preparing estimates of conductance of vias and wire segments in the form of conductance matrix G; and preparing estimates of current I at each intersection based on power consumed by surrounding circuitry, and current vector "I" and conductance matrix "G" are used to solve for voltage drop $\Delta V$, in a matrix equation $G\Delta V = I$, and the voltage drop is displayed, to allow a human to make changes in the design. Pins of unconnected hard macros are temporarily connected to their closest wires, and current therethrough is included in the estimates.

21 Claims, 13 Drawing Sheets

U.S. PATENT DOCUMENTS

| | | | |
|---|---|---|---|
| 6,510,539 | B1 | 1/2003 | Deemie et al. |
| 6,523,154 | B2 | 2/2003 | Cohn et al. |
| 6,560,505 | B1 | 5/2003 | Kikuchi et al. |
| 6,598,206 | B2 | 7/2003 | Darden et al. |
| 6,675,139 | B1 | 1/2004 | Jetton et al. |
| 6,691,296 | B1 | 2/2004 | Nakayama et al. |
| 6,794,674 | B2 | 9/2004 | Kusumoto |
| 6,981,230 | B1 | 12/2005 | Lin et al. |
| 6,991,961 | B2 | 1/2006 | Hubbard et al. |
| 7,043,389 | B2 | 5/2006 | Plusquellic |
| 7,111,265 | B1 | 9/2006 | Tan et al. |
| 2001/0039642 | A1 | 11/2001 | Anzai |
| 2002/0013931 | A1 | 1/2002 | Cano et al. |
| 2002/0170020 | A1* | 11/2002 | Darden et al. .................. 716/2 |
| 2003/0140327 | A1 | 7/2003 | Lai et al. |
| 2003/0151047 | A1 | 8/2003 | Corbett et al. |
| 2003/0237059 | A1 | 12/2003 | Schultz |
| 2004/0015804 | A1 | 1/2004 | Nakayama et al. |
| 2004/0088443 | A1 | 5/2004 | Tran et al. |
| 2004/0163054 | A1 | 8/2004 | Frank et al. |
| 2004/0268281 | A1 | 12/2004 | Dotson et al. |
| 2005/0050502 | A1 | 3/2005 | Kurihara et al. |
| 2005/0055652 | A1* | 3/2005 | Lin et al. ....................... 716/5 |
| 2005/0077634 | A1 | 4/2005 | Seaman et al. |
| 2005/0090916 | A1 | 4/2005 | Aghababazadeh et al. |
| 2005/0236177 | A1 | 10/2005 | Inagaki et al. |
| 2005/0273748 | A1* | 12/2005 | Hetzel et al. .................. 716/14 |
| 2006/0080630 | A1 | 4/2006 | Lin |
| 2006/0095872 | A1* | 5/2006 | McElvain et al. .............. 716/1 |
| 2006/0239102 | A1 | 10/2006 | Saita et al. |
| 2007/0079261 | A1 | 4/2007 | Kusumoto |
| 2008/0066026 | A1* | 3/2008 | Tai et al. ....................... 716/4 |
| 2009/0044162 | A1 | 2/2009 | Yoshioka |
| 2009/0132990 | A1* | 5/2009 | McElvain et al. ............. 716/14 |

OTHER PUBLICATIONS

Oh, J. et al. "Multi-pad Power/Ground Network Design for Uniform Distribution of Ground Bounce", (DAC), 1998, pp. 287-290.

Chen, H. H. et al. "Power Supply Noise Analysis Methodology for Deep-Submicron VLSI Chip Design", (DAC), 1997, pp. 1-6.

Nassif, S. R. et al. "Fast Power Grid Simulation", (DAC), 2000, pp. 1-6.

Su, H. et al. "Analysis and Optimization of Structured Power/Ground Networks", Department of Electrical and Computer Engineering University of Minnesota, believed to be prior to Oct. 2004, pp. 1-33.

Golub, G. H. et al. "Matrix Computations", Third Edition 1996, The Johns Hopkins University Press, pp. 520-537.

Eisenstat, S. C. et al. "Yale Sparse Matrix Package I: The Symmetric Codes", International Journal for Numerical Methods in Engineering, vol. 18, 1982, pp. 1145-1151.

Pillage, L. T. et al. "Electronic Circuit and System Simulation Methods", McGraw-Hill, Inc., 1994, pp. 1-17.

Bentley, J. L. et al. "Data Structures for Range Searching", Computer Surveys, vol. 11, No. 4, Dec. 1979, pp. 397-409.

Gupta, et al. "A High Level Interconnect Power Model for Design Space Exploration", Int'l Conference on Computer Aided Design, Nov. 9-13, 2003, pp. 551-558.

U.S. Appl. No. 10/976,719, filed Oct. 29, 2004 by Sung-Hoon Kwon et al.

Office Action dated Feb. 9, 2007 in U.S. Appl. No. 10/976,719.

Amendment dated Jun. 11, 2007 in U.S. Appl. No. 10/976,719 by inventor Sung-Hoon Kwon et al.

Office Action dated Aug. 27, 2007 in U.S. Appl. No. 10/976,719.

Amendment dated Oct. 29, 2007 in U.S. Appl. No. 10/976,719 by inventor Sung-Hoon Kwon et al.

U.S. Appl. No. 10/976,411, filed Oct. 29, 2004 by Yi-Min Jiang et al.

Office Action dated Jul. 3, 2006 in U.S. Appl. No. 10/976,411.

Amendment dated Nov. 3, 2006 in U.S. Appl. No. 10/976,411 by inventor Yi-Min Jiang et al.

Office Action dated Jan. 18, 2007 in U.S. Appl. No. 10/976,411.

Interview Summary dated May 10, 2007 in U.S. Appl. No. 10/976,411.

Office Action dated May 1, 2007 in U.S. Appl. No. 10/976,411.

Amendment dated Sep. 4, 2007 in U.S. Appl. No. 10/976,411 by inventor Yi-Min Jiang et al.

Notice of Allowance dated Oct. 22, 2007 in U.S. Appl. No. 10/976,411.

U.S. Appl. No. 10/976,653, filed Oct. 29, 2004 by Philip Hui-Yuh Tai et al.

Office Action dated Jan. 29, 2007 in U.S. Appl. No. 10/976,653.

Amendment dated Apr. 30, 2007 in U.S. Appl. No. 10/976,653 by inventor Philip Hui-Yuh Tai et al.

Office Action dated Jul. 27 2007 in U.S. Appl. No. 10/976,653.

Amendment dated Oct. 29, 2007 in U.S. Appl. No. 10/976,653 by inventor Philip Hui-Yuh Tai et al.

Notice of Allowance dated Nov. 30, 2007 in U.S. Appl. No. 10/976,653.

U.S. Appl. No. 11/982,094, filed Oct. 31, 2007 by Philip Hui-Yuh Tai et al.

Office Action dated Jan. 7, 2010 in U.S. Appl. No. 11/982,094.

Amendment dated Apr. 7, 2010 in U.S. Appl. No. 11/982,094 by inventor Philip Hui-Yuh Tai et al.

* cited by examiner

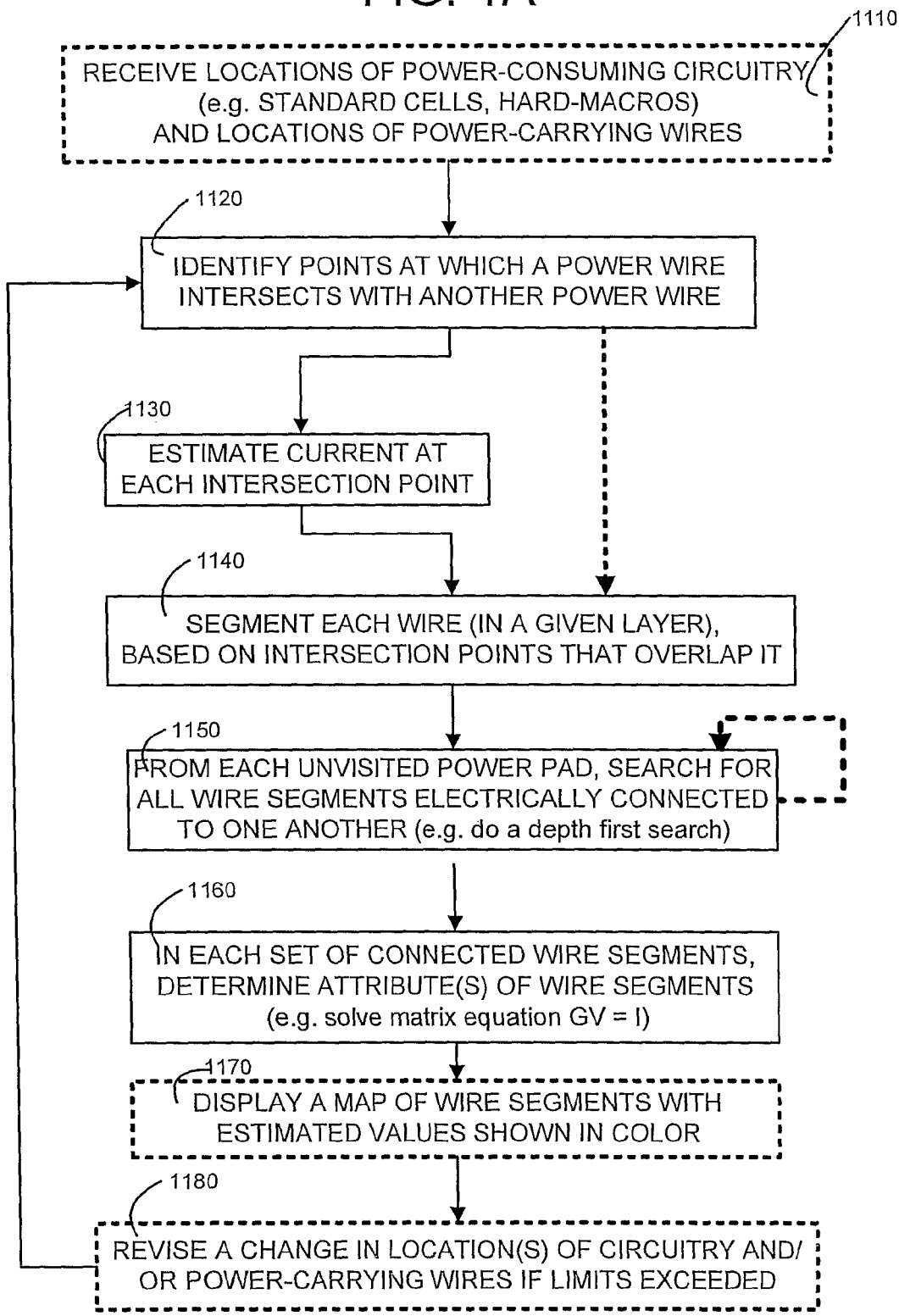

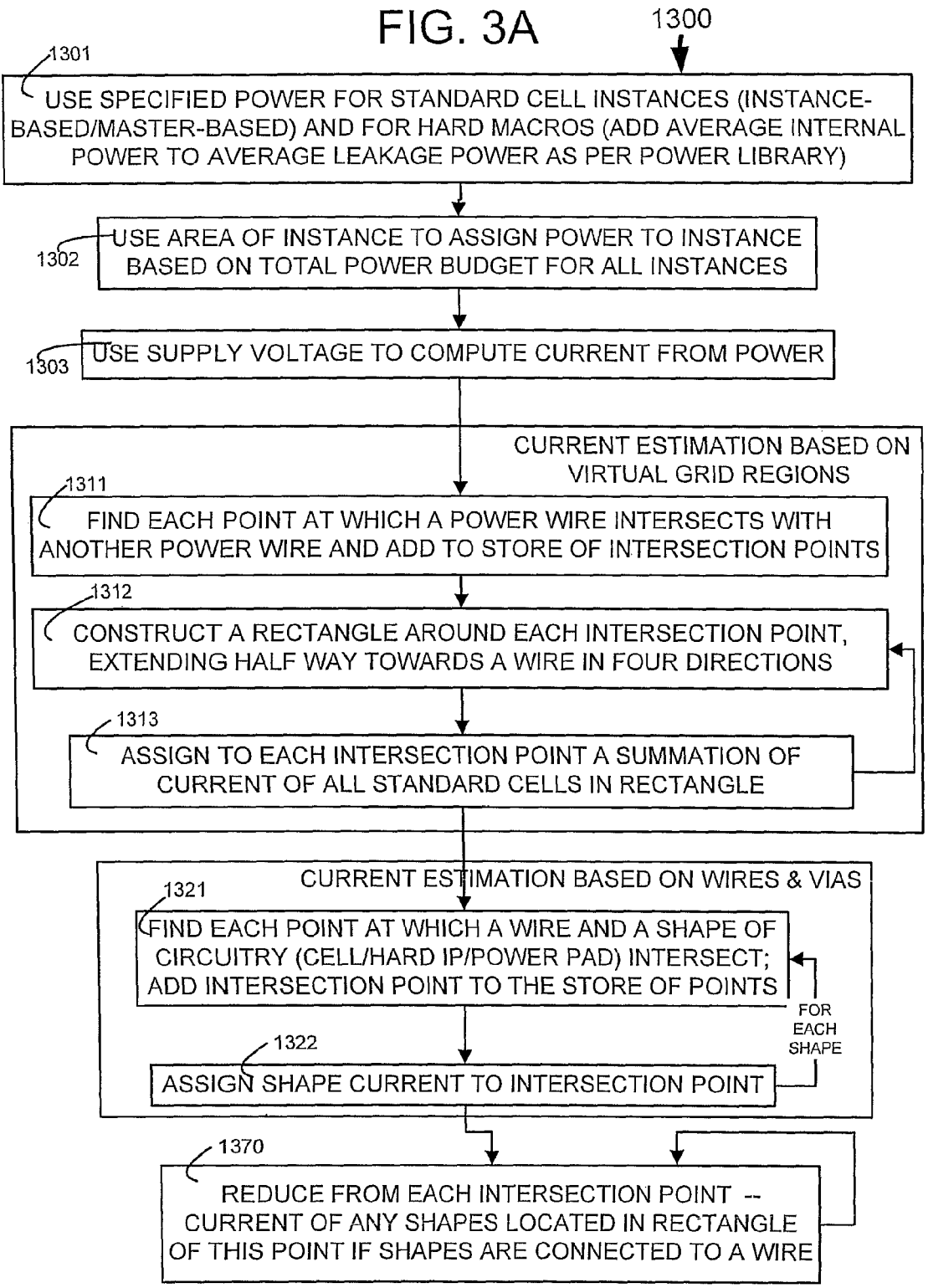

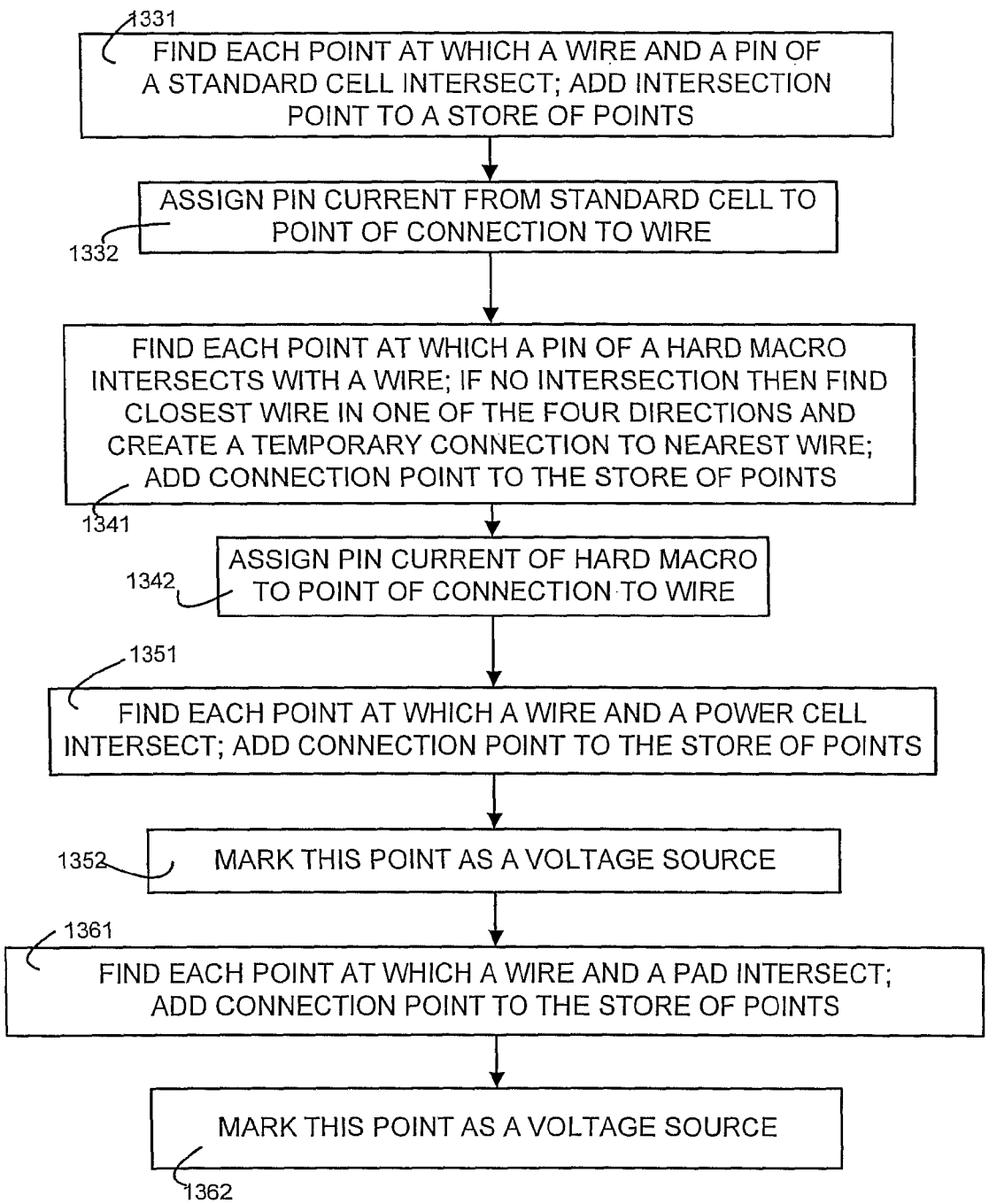

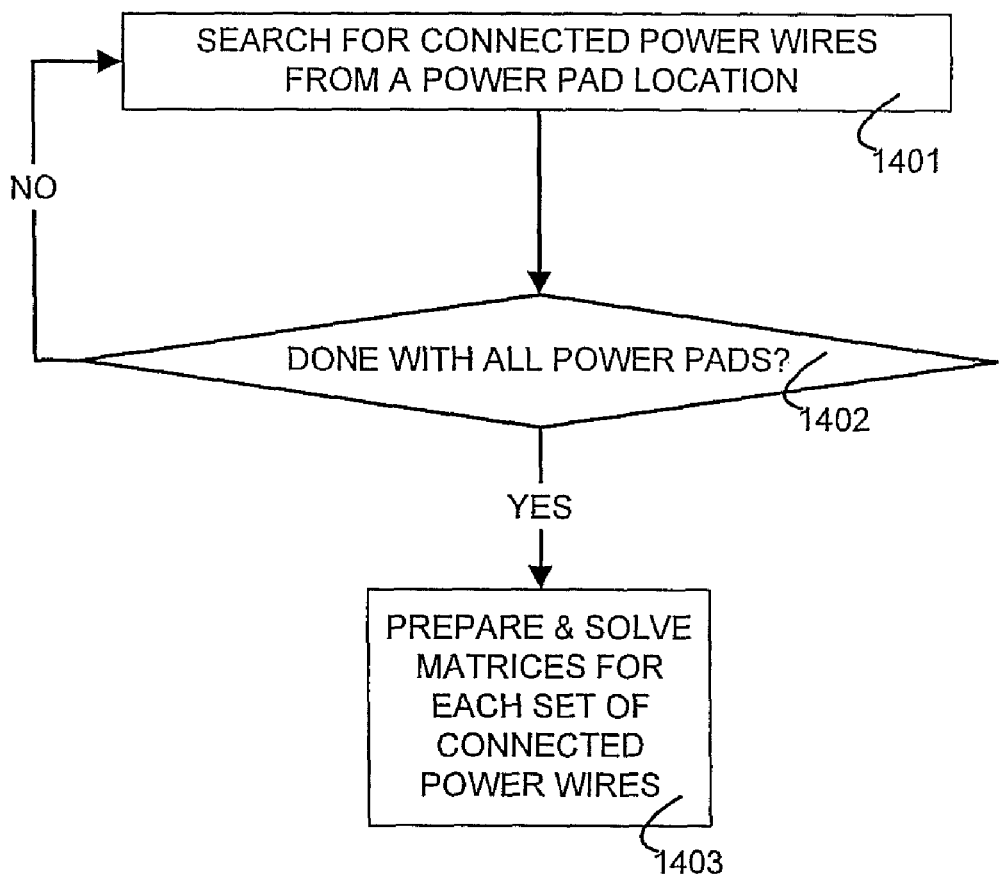

POWER NETWORK ANALYZER FOR AN INTEGRATED CIRCUIT DESIGN

CROSS-REFERENCE TO PARENT APPLICATION

This application is a divisional application of U.S. patent application Ser. No. 10/976,653, entitled "POWER NETWORK ANALYZER FOR AN INTEGRATED CIRCUIT DESIGN" filed on Oct. 29, 2004 by Philip Hui-Yuh Tai, Yi-Min Jiang, and Sung-Hoon Kwon now U.S. Pat. No. 7,346,869.

U.S. patent application Ser. No. 10/976,653 is incorporated by reference herein in its entirety, including the CD-ROM appendix present therein.

CROSS-REFERENCE TO RELATED APPLICATIONS

This application is related to and incorporates by reference herein in their entirety the following two commonly-owned patent applications, including the CD-ROM appendices present therein:

U.S. patent application Ser. No. 10/976,719 now U.S. Pat. No. 7,536,658, entitled "POWER PAD SYNTHESIZER FOR AN INTEGRATED CIRCUIT DESIGN" filed on Oct. 29, 2004 by Sung-Hoon Kwon, Philip Hui-Yuh Tai and Yi-Min Jiang; and U.S. patent application Ser. No. 10/976,411 now U.S. Pat. No. 7,353,490, entitled "POWER NETWORK SYNTHESIZER FOR AN INTEGRATED CIRCUIT DESIGN" filed filed on Oct. 29, 2004 by Yi-Min Jiang, Philip Hui-Yuh Tai and Sung-Hoon Kwon.

BACKGROUND

1. Field of the Invention

The invention relates to design of semiconductor chips. More specifically, the invention relates to a method and an apparatus for analyzing a power supply network in a design of an integrated circuit.

2. Related Art

A power supply network that is to be built in an integrated circuit die can be analyzed in any of a number of different ways known in the prior art. U.S. Pat. No. 5,598,348 granted to Rusu et al. on Jan. 28, 1997 entitled "Method and apparatus for analyzing the power network of a VLSI circuit" is incorporated by reference herein in its entirety. This patent describes extracting the power network and then deriving a compacted power network including a compacted primary resistive network to characterize the electrical resistance of power trunks within the semiconductor circuit layout. The compacted power network is simulated to identify areas that do not comply with predetermined criteria, such as electromigration limits and voltage drop limits. The layout may be reconfigured to satisfy the limits.

U.S. Pat. No. 6,675,139 granted to Jetton et al. on Jan. 6, 2004 entitled "Floor plan-based power bus analysis and design tool for integrated circuits" is also incorporated by reference herein in its entirety. This patent states, as background, that post-layout simulation takes a long time to complete (typically several days) and on completion may indicate problems with excessive voltage drop and electromigration. Finding such problems after post-layout simulation requires the designer to change the IC floor plan and re-run the layout and post-layout simulation, which adds days, if not weeks, to the design cycle. In addition, post-layout simulation time makes testing and comparing several different power-bus grid designs extremely time consuming. This problem is conventionally solved by over-estimating a circuit's power requirements but this is a sub-optimal use of the IC's available silicon core space.

U.S. Pat. No. 6,675,139 proposes a solution to the problems described in the previous paragraph as follows: mapping wire segments forming the power-bus grid to the integrated circuit core, specifying at least one power zone in the integrated circuit core, calculating a current density and voltage drop in the wire segments with respect to the power zone, and displaying the current density and voltage drop in the wire segments.

U.S. Pat. No. 6,446,245 granted to Xing et al. on Sep. 3, 2002 and entitled "Method and Apparatus for performing power routing in ASIC design" is incorporated by reference herein in its entirety. This patent states that traditionally power routing is performed during the floor planning stage, before cell placement, and for this reason the location of the standard cells and hence the power consumption behavior is not known at the power routing stage. Also this design flow creates obstacles for cell placement optimization. Therefore, this patent describes a method in which standard cells are placed in the physical layout prior to power routing, and they are placed in a bottom-up hierarchical manner.

U.S. Pat. No. 6,311,147 granted to Tuan et al. on Oct. 30, 2001 entitled "Integrated circuit power net analysis" is incorporated by reference herein in its entirety. This patent uses a circuit simulator to determine current values for integrated circuit devices at specified supply voltages. A power net simulator uses the current values to calculate various characteristics such as voltage drop, current density and ground bounce. A layout representation of the power net is shown on a computer display along with user-specified characteristics.

U.S. Pat. No. 6,523,154 granted to Cohn et al. on Feb. 18, 2003 entitled "Method for supply voltage drop analysis during placement phase of chip design" is incorporated by reference herein in its entirety. This patented method provides a library of circuits for use in designing an integrated circuit chip and determines a supply current requirement and an operating voltage range for each circuit in the circuit library. The method then includes calculating an admittance matrix representing the power grid with a pre-specified array of circuit ports defined by intersection of the power grid and a modeling grid, assigning regions of the power grid to each of the ports, and placing a set of circuits from the circuit library in regions on the power grid. The method further includes calculating a total node current at each of the ports by summing current requirements of all of the circuits located in the regions, calculating a node voltage at each of the ports by solving a system of linear equations corresponding to the calculated admittance matrix, imposing a penalty to each node having a node voltage outside of a predetermined range, and calculating the node voltages and the penalties to a cost-based floorplanning/placement analysis tool.

SUMMARY

A design of an integrated circuit device, in which locations of memory and/or logic circuitry (such as a standard cell or a hard macro) and locations of power-carrying wires are identified (hereinafter simply "power wires"), is analyzed in a computer that is appropriately programmed (also called "power network analyzer"). Specifically, the computer is programmed to perform at least the following three acts, automatically: (a) identifying from among the power wires, a group of power wires that are electrically connected to one another, through vias; (b) cutting up power wires into a number of segments at least at each location of a via (in some embodiments at least at an intersection point between two power wires); and (c) preparing estimates of an attribute of wire segments identified in act (b).

In many embodiments, each power wire that happens to be closest to a pin of a hard macro cell is temporarily treated as being connected to that pin, and the power wire is segmented at the point of connection. Also, current in the just-described power wire, at the point of connection, is estimated to be the current in the just-described pin of the hard macro cell. An estimate of current passing through a point in an uppermost layer at each via (or intersection) identified in act (b), is based on power consumed by neighboring standard cells but not hard macro cells. Standard cells are treated as neighboring if located within a distance half way towards an adjacent power wire, and unconnected to any power wire. If a standard cell is connected to one or more power wires, then it is treated in the same manner as a hard macro cell except that all current through the standard cell is assumed to pass through the largest pin of the standard cell.

In addition, the power network analyzer also prepares a matrix of conductances of each via and each wire segment identified as discussed above. Next, the conductances matrix and the above-described current estimates are used to solve a matrix equation to calculate voltage drop $\Delta V$ across each wire segment. In addition to or instead of voltage drop, an estimate of any other attribute, such as electromigration may be calculated, depending on the embodiment. The attribute values resulting from such calculation are displayed to the user, who may then modify their IC design and/or power plan for the IC design.

Note that the above-described act (a) of finding electrically connected power wires ensures that a matrix equation based on the resulting set of connected wires is solvable. Specifically, eliminating unconnected power wires when preparing the conductance matrix eliminates linear dependencies in the matrix which in turn makes it invertible. Also, accuracy of the calculations is improved by using each pin of a hard macro cell (whether connected or unconnected) to segment a power wire that is adjacent thereto. This is in contrast to the prior art method of uniformly distributing the hard macro's current to the nearest vias (or power wire intersections), because the prior art's uniform distribution fails to account for power distribution within the hard macro cell. Accuracy is further improved by including the conductance of vias in the conductance matrix, which to the inventors' knowledge were not modeled in any conductance matrix of the prior art. Accuracy is also believed to be improved due to estimation of current in the uppermost layer nodes, instead of corresponding nodes in a lower layer (e.g. at the top of a via instead of the via's bottom).

Note that although several techniques improve accuracy as described above, some embodiments may implement fewer than all the above-described techniques. For example, a first embodiment uses all the above techniques except that current in a hard macro cell is handled in a different way. As another example, a second embodiment uses all the above techniques except for ignoring via conductance (i.e. vias are assumed to have zero resistance). As yet another example, a third embodiment uses all the above techniques except for treating connected standard cells in the same way as unconnected standard cells. Note that most embodiments use a majority of the above-described techniques, while at least some embodiments use all the techniques.

Depending on the embodiment, a power network analyzer may perform some of the above-described acts in different order. Specifically, one power network analyzer estimates the current prior to segmenting the power wires and estimates the conductance subsequent to segmenting, whereas another power network analyzer estimates both current and conductance subsequent to segmenting. Therefore, numerous such power network analyzers will become apparent to the skilled artisan.

BRIEF DESCRIPTION OF THE FIGURES

FIG. 1A illustrates, in a high-level flow chart in accordance with the invention, acts performed to analyze a power network of an integrated circuit (IC) design.

FIG. 3A illustrates, in an intermediate-level flow chart, acts performed in some embodiments of the invention, to implement act 1130 of FIG. 1A.

FIG. 3B illustrates, in a low-level flow chart, acts performed in some embodiments of the invention, to implement acts 1321 and 1322 of FIG. 3A.

FIGS. 4A-4C illustrate, in flow charts, acts performed in some embodiments of the invention to implement act 1160 of FIG. 1A.

DETAILED DESCRIPTION

Figure 1B:
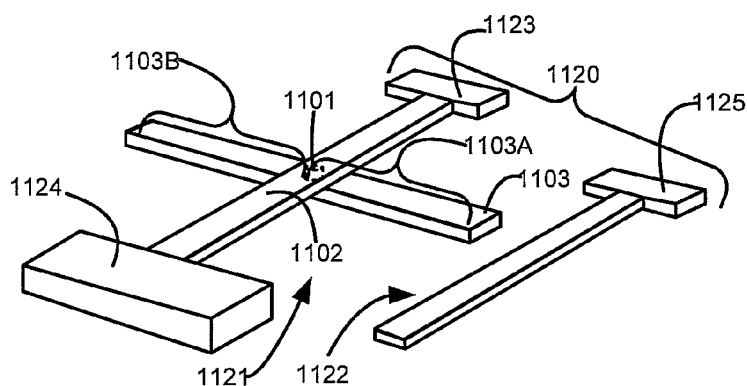
FIG. 1B illustrates, in a perspective view, an exemplary circuitry of the prior art that is to be analyzed.

A computer is programmed in accordance with the invention, to analyze a power network on receipt (as per act 1110 in FIG. 1A) of a design of an integrated circuit device, in which locations of memory and/or logic circuitry (such as instances of standard cells or hard macro cells), as well as locations of power-carrying wires have been identified. The power-carrying wires are hereinafter referred to simply as "power wires". Note that the power wires can be at any predetermined voltage, e.g. Vdd or Vss or ground.

In some embodiments, the programmed computer receives the just-described information from an integrated circuit (IC)

design database (such as, e.g. MILKYWAY) which holds a netlist produced by synthesis of a description originally expressed in a hardware description language, such as VERILOG or VHDL. The computer is programmed to retrieve from database (located in persistent storage such as a hard disk) and store into its main memory, location data on the circuitry (e.g. data 501 in FIG. 5B) and on the power wires (e.g. data 502). Note that the programmed computer also has access to one or more libraries in the normal manner, such as a master file which identifies pin shapes, and a technology file which identifies information on various layers (such as metal layer 1, metal layer 2, . . . cut layer 1 etc).

Such a programmed computer identifies (as per act 1120) a number of locations (in some embodiments all locations) at which power wires in the design intersect with one another. A point at the center of each overlapping region between two power wires is identified by the x and y coordinates. Typically, if a via is present in such an overlapping region, the just-described point is at the center of the via. For example, in FIG. 1B, an intersection point 1101 is identified as being at the center of a region of intersection between power wire 1102 and power wire 1103. Note that such intersection points are found regardless of the layers in which power wires are located (e.g. by assuming all power wires and all circuitry are located in a single layer). The center points of intersection regions are stored in a data structure (such as a tree), and are used in several acts illustrated in FIG. 1A. These points are also referred to below as "virtual grid" points or simply as "intersection" points.

In some embodiments, after virtual grid points are identified, current is estimated for each virtual grid point (as per act 1130), based on standard cells located in the neighborhood of each point and their connectivity. Note that act 1130 is optional, and in alternative embodiments such an act may be performed after performance of act 1140 which is described below.

In some embodiments, in act 1130, the computer is programmed to assign to each intersection point any current that may be estimated to be passing through a power pin at the point (if the power pin is present), and also any current passing through instances of standard cells located within a rectangle. For example, a rectangle 1104 (FIG. 1C) is shown centered around the intersection point 1101 and extending half way towards the nearest power wire in each of four directions (east, west, north, and south). Note that in this act 1130, current is assigned to intersection point 1101 (FIG. 1C) only if this current is not already assigned to another point.

Current passing through standard cell instances may be estimated in any manner known in the art. In one example, current is estimated based on a power budget for a standard cell instance (which may be user-input or based on instance's area relative to area of all circuitry) divided by nominal supply voltage. In an example shown in FIG. 1D, current for an intersection point 1105 is determined from an area 1106 of a standard cell 1107, which is the area of overlap (i.e. intersection) of cell 1107 with a rectangle 1108 that surrounds intersection point 1105. Rectangle 1108 is formed by a virtual grid of lines located half-way between power wires. In this example if the overlap area is $\frac{1}{3}^{rd}$ of the total area of cell 1107, then $\frac{1}{3}^{rd}$ of the current that is needed by cell 1107 is assigned to point 1105 (at which point a current sink is assumed to be located, which current sink is used with other such current sinks, to solve a matrix equation as discussed later).

Note that the just-described method of current computation is used only for standard cells and it is not used to compute current at an intersection point 1111 whose rectangle overlaps with hard macro cell 1109. Instead, the current passing through each power or ground pin of a hard macro cell (as identified in the IC design database) is assigned to a closest point on a power wire that is nearest to that pin. Therefore, in the example of FIG. 1E, any current through pin 1112 is assigned to a point 1113 which happens to be the closest point on power wire 1114, regardless of whether or not the hard macro cell is connected to power wires. Similarly, the current in pin 1115 is assigned to point 1116 on wire 1114. Therefore, temporary connections are assumed to be present between such points 1113 and 1116 on wire 1114 and the respective pins 1112 and 1115 of hard macro cell 1109.

Figure 1C:
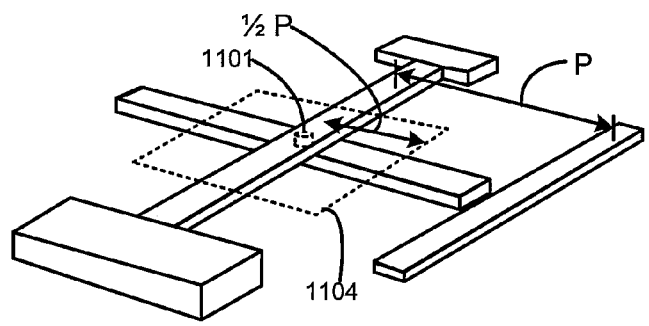
FIG. 1C illustrates a grid used in some embodiments to identify standard cells that contribute current to a current sink at an intersection point.
Figure 1D:
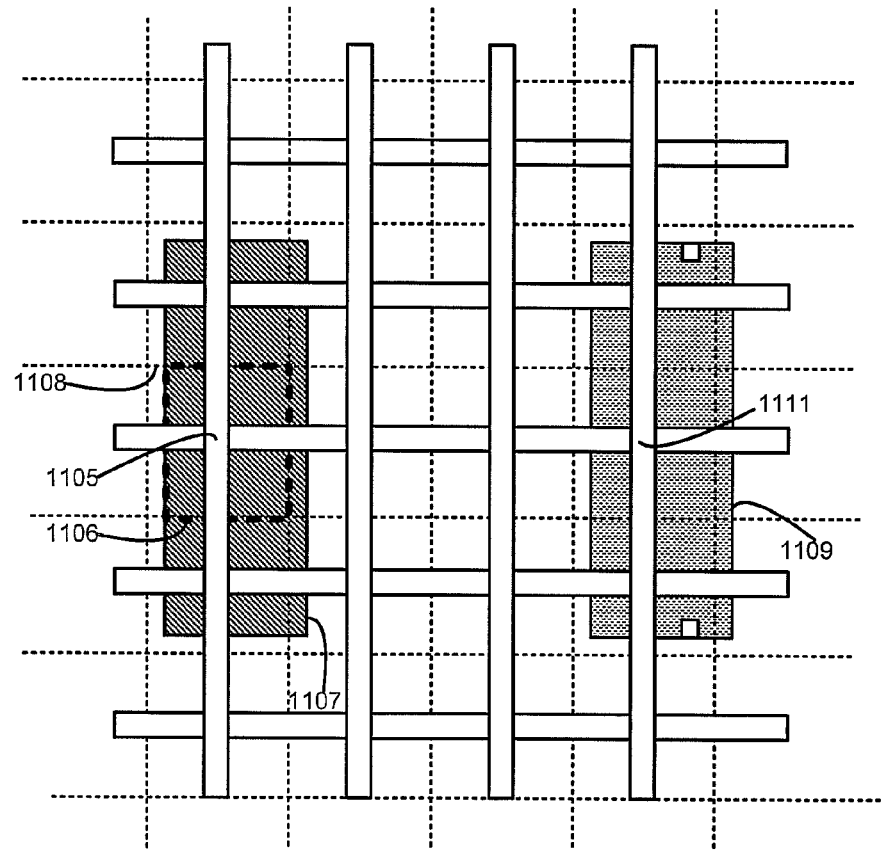
FIGS. 1D and 1E illustrate current computation for unconnected standard cells and hard macro cells respectively.
Figure 1E:
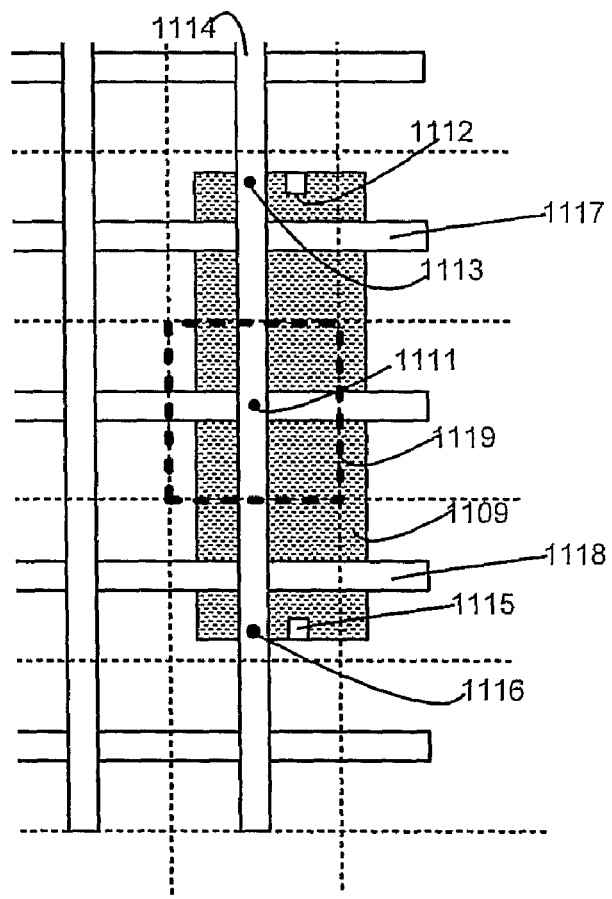

In the example in FIG. 1E, point 1111 on wire 1114 does not have any current assigned to it, because there is no standard cell in its rectangle 1119. Although a hard macro cell 1109 overlaps with the rectangle 1119, this cell 1109 has only two power/ground pins 1112 and 1115 which have their current assigned to the respective closest points 1113 and 1116 on wire 1114. Note further that if cell 1109 were a standard cell that is connected to power wires 1117 and 1118, then all the current consumed in the entirety of cell 1109 is assigned to whichever of pins 1112 and 1115 has a larger cross-section, and thereafter to a corresponding power wire that is connected to that larger cross-section pin.

In many embodiments of the invention, the programmed computer automatically cuts up (as per act 1140 in FIG. 1A) power wires in a plan, based on intersection of the power wires with points that are identified in act 1120. In some embodiments, each power wire in a given layer (e.g. metal 6) is cut (i.e. segmented) at the location of each point for which current has been computed as discussed above. Therefore, in the example in FIG. 1B, power wire 1103 is cut at point 1101 to form wire segments 1103A and 1103B. Similarly, power wire 1102 is also cut at point 1101.

Thereafter, as per act 1150 in FIG. 1A, starting with a power pad (either preexisting or proposed) the programmed computer performs a search for all power wires (and inherently their wire segments) that are electrically connected to one another by one or more vias. In many embodiments, a depth first search is made although in other embodiments other kinds of searches, such as breadth first search may be done. Note that during the search one or more additional power pads may be reached from the current power pad from which the search is being done, and if so these power pads are marked as being visited. One or more power wires that are encountered during this search are identified as a set, which are analyzed together as discussed below in reference to act 1160. After the search from a current power pad is completed, the search is repeated from any unvisited power pads, to identify another set. In this manner, a number of sets are identified from among all power wires in a plan.

In the example illustrated in FIG. 1B, two sets 1121 and 1122 are identified from among all power wires 1120 in the power plan shown in FIG. 1B as follows. Starting with power pad 1123, a first search is performed and power wires 1102 and 1103, as well as a hard macro cell 1124 are identified as forming set 1121. Next, starting with pad 1125 which has not yet been visited, a second search is performed and wire 1126 is identified as forming set 1122. Note that power wires in a given set (e.g. set 1121) are not electrically connected to power wires in any other set (e.g. set 1122), e.g. because they belong to power networks that are at different voltage levels such as 3 volts and 5 volts. Identification of a set of connected wires is performed so that only wires in a given set are used in a matrix based analysis that is performed in some embodiments (as described below). Such identification of a set of connected wires avoids creating singularities in the analysis that if present would prevent or make difficult the solution of a matrix equation during the analysis.

Next, in act 1160 (FIG. 1A) of several embodiments of the invention, each wire segment of a power wire in a given set (containing wires known to be connected to one another) is modeled as a resistor for analysis. For example, wire segment 1103A is modeled by resistor R5 and wire segment 1103B is modeled by resistor R4 (see FIG. 1F). Note that if a via forms an electrical connection between two power wires, then that via is also modeled as a resistor. For example, a via as shown in FIG. 1B at point 1101, which connects wire 1102 to wire 1103 is modeled by resistor R2 (see FIG. 1F). In this manner, the computer may be programmed to automatically prepare estimates of values of any attribute (as per act 1160 in FIG. 1A), although conductance is estimated in a number of embodiments, for each wire segment and for each via. As noted elsewhere, the estimate of conductance is based on width, length and thickness of each wire segment, and on its sheet resistance as identified in a technology file, for a specific layer in which the wire segment is to be formed.

Depending on the embodiment, the computer may be programmed to automatically prepare estimated values of any attributes that may or may not depend on other attributes. For example, in some embodiments, the computer is programmed to find voltage drop for each wire segment, which in turn depends on the conductance of each wire segment and the current passing there-through. In this example, if current estimates have not yet been prepared, they are now prepared in the manner described above in reference to FIGS. 1D and 1E.

Figure 1F:
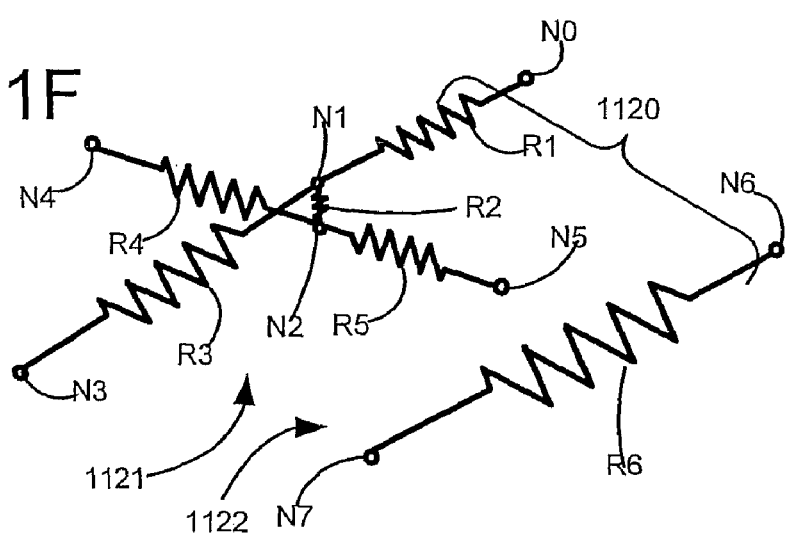
FIG. 1F illustrates a resistance network that is created in accordance with the invention to model the circuitry illustrated in FIG. 1B.

In the example illustrated in FIGS. 1B and 1F, two current sinks are modeled: a first current Isink is modeled at node N1 located at point 1101 in the topmost layer (in which wire 1102 and pad 1123 is located). Such topmost layer location of the current sink (in which power pads are also located) provides more accurate results from a matrix analysis of the type discussed in detail below. Moreover, a second current sink of current Ihard-macro is modeled at node N3 (at a pin of hard macro cell 1124). These two current sinks are illustrated in FIG. 1G.

Figure 1G:
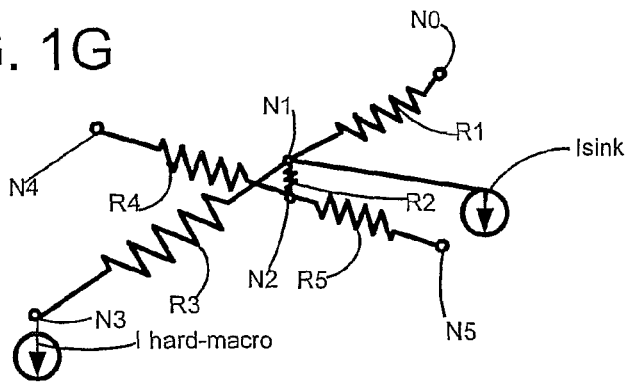
FIG. 1G illustrates location of current sinks in an uppermost layer in some embodiments of the invention, to model current consumed by neighboring circuitry.

Note that in FIG. 1G, the power wire set 1122 is not shown because this set is not analyzed when power wire set 1121 is analyzed. During such analysis, a current vector I and a conductance matrix "G" are formed in some embodiments, and used to solve a matrix equation $G\Delta V=I$, to obtain voltage drop $\Delta V$ across each wire segment. In addition to or instead of voltage drop, an estimate of any other attribute, such as electromigration may be calculated, e.g. as the current flowing through a power wire divided by the wire width.

Depending on the embodiment, a map of the attribute that has been obtained for each wire segment (e.g. voltage drop $\Delta V$) may be displayed to a human, as per act 1160 (FIG. 1A). Note that act 1160 is optional, and the estimated values of the attribute may be used in other applications, such as automatically determining the number and placement of power pads.

If an attribute's values are displayed to a human, then the human may change the design as per act 1180 in FIG. 1A (e.g. by changing one or more locations) in an attempt to conform values of the displayed attribute, in the changed design, to a predetermined limit. Thereafter, the above-described power network analysis may be repeated on the changed design (see act 1170 and the branch looping back to act 1120 in FIG. 1A).

Figure 2:
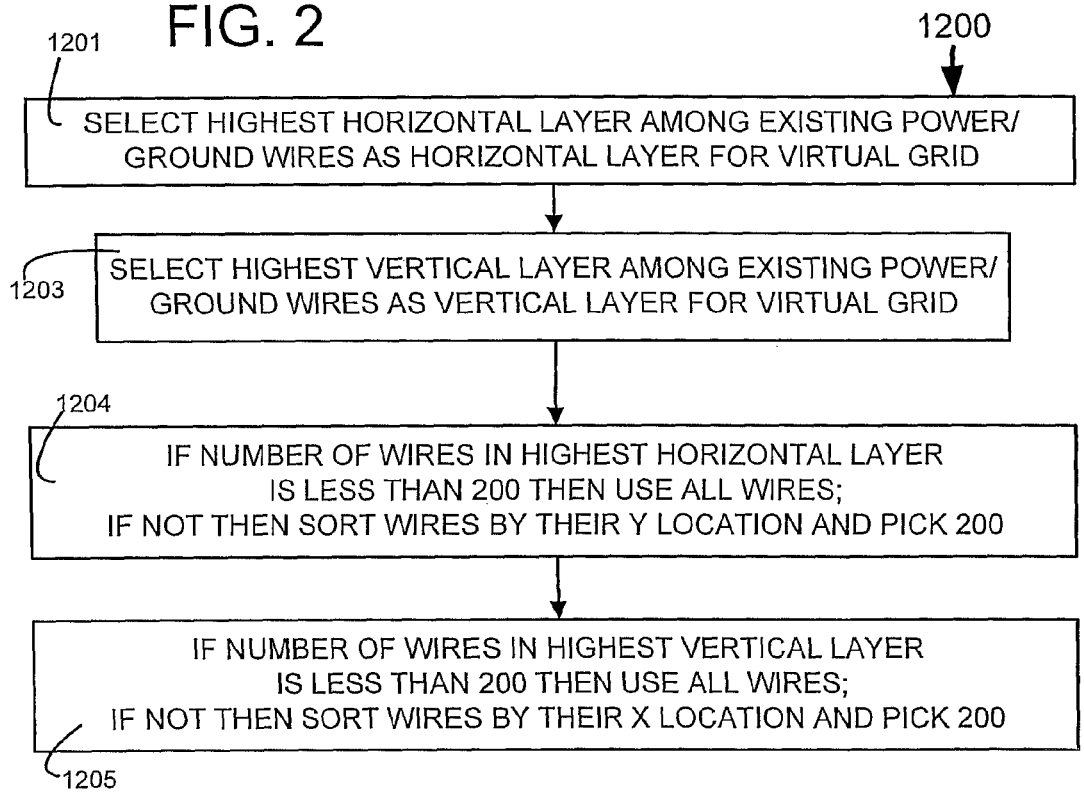
FIG. 2 illustrates, in an intermediate-level flow chart, acts performed in some embodiments of the invention, to implement act 120 of FIG. 1A.

Certain embodiments in accordance with the invention compute intersection points (as per act 1120) by use of only a limited number of power wires as illustrated by operation 1200 in FIG. 2. Specifically, as per act 1201 in FIG. 2, the computer is programmed to select the highest numbered horizontal layer among all existing power and ground wires as the horizontal layer in which the virtual grid is to-be-formed. As an example, if metal 4 and metal 6 both contain horizontal power wires (with metal 4 coupled to VDD and metal 6 coupled to ground), then metal 6 is picked to be the virtual grid's horizontal layer. Similarly, as per act 1202, the highest metal layer in which a vertical power wire exists is picked to be the virtual grid's vertical layer.

Next, as per act 1203, if the number of wires in a horizontal layer is less than a predetermined number (e.g. 200) then the computer is programmed to use all wires. However, if the number of wires is more than the predetermined number, then the computer is programmed to sort the wires by their Y location, and thereafter pick the predetermined number of wires (e.g. 200 wires). In several of these embodiments, the computer picks 200 wires by skipping an appropriate number of wires depending on the total. For example, if there were 400 wires total, then 200 wires are selected by skipping every other wire. If there are "N" wires then the computer is programmed to pick every $2^{[(N/200)-1]}$ wire as the wire to be used in the analysis. Act 1204 is similarly performed, to pick a predetermined number of wires in the vertical layer. Note that the two predetermined numbers in acts 1203 and 1204 are identical in some embodiments, although in other embodiments they could differ. Next, the wires that have been picked, in each of the two layers for use in analysis, are used to find intersection points in the above-described manner. Note that the number "200" is to be considered an illustrative example, and other numbers may be used in other embodiments of the power network analyzer.

Several embodiments in accordance with the invention allocate current (as per act 1130) as illustrated by operation 300 in FIG. 3A. Specifically, as per act 1301 in FIG. 3A, the computer is programmed to check if the human (also called "user") has specified power consumption of any instance of circuitry. For example, in a file—the user can specify power consumption, either instance-based or master-based. In instance-based specification, for an instance name "AAA" the user may say the power is 30 milliwatts. In master-based specification, the master name 'BBB' the user may say the power is 15 milliwatts, in which case all instances with this master are set to 15 milliwatts. If the user has provided such a file, then the computer is programmed to use the specified power.

For hard macros—e.g. memory—if the user gives a power library for each hard macro, then the computer is programmed (also in act 1301 of FIG. 3A) to find average internal power for the library, and average of the leakage power, and store both. The computer then sums up these two average powers and the total is used as the power consumption for the hard macro. Note that the power library may specify internal power for each macro which is pattern dependent, with different patterns using different power. Some embodiments are made pattern independent by simply averaging the power (and the leakage power) for a hard macro across all input patterns that are specified. The average power and the average leakage power are then summed up and used for the hard macro.

Figure 5A:
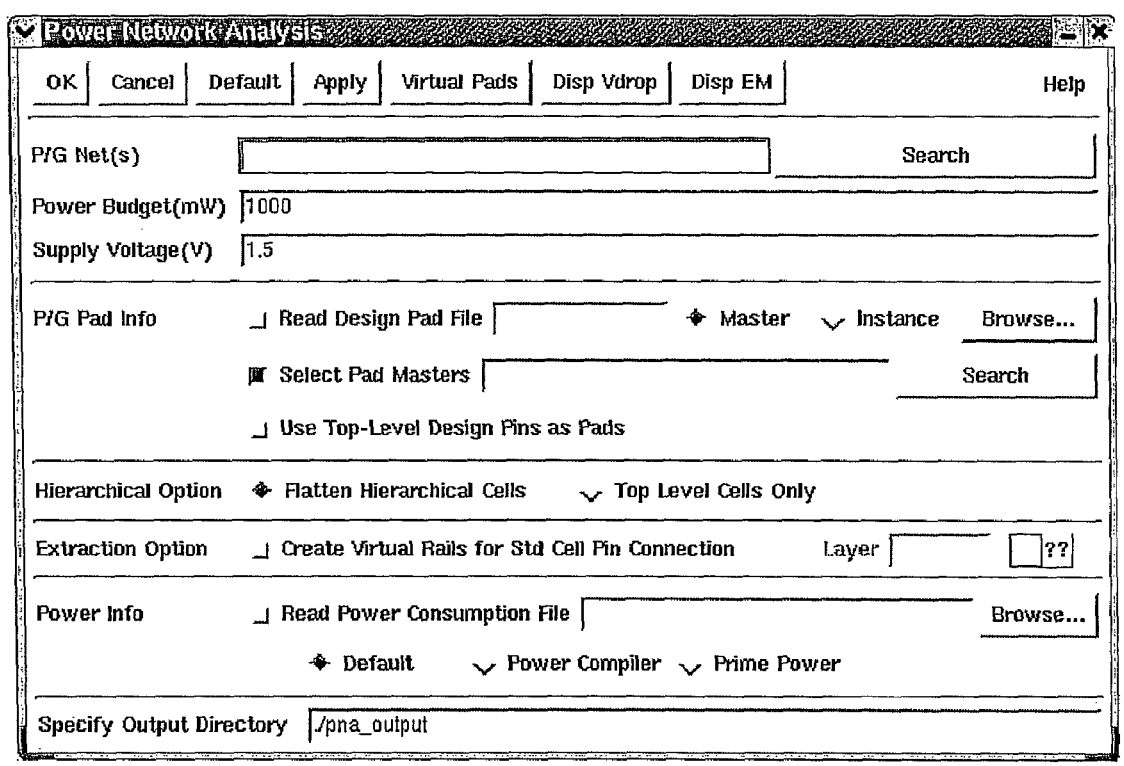
FIG. 5A illustrates a graphical user interface (GUI) that is displayed by a computer in one specific exemplary implementation of the invention.
Figure 5B:
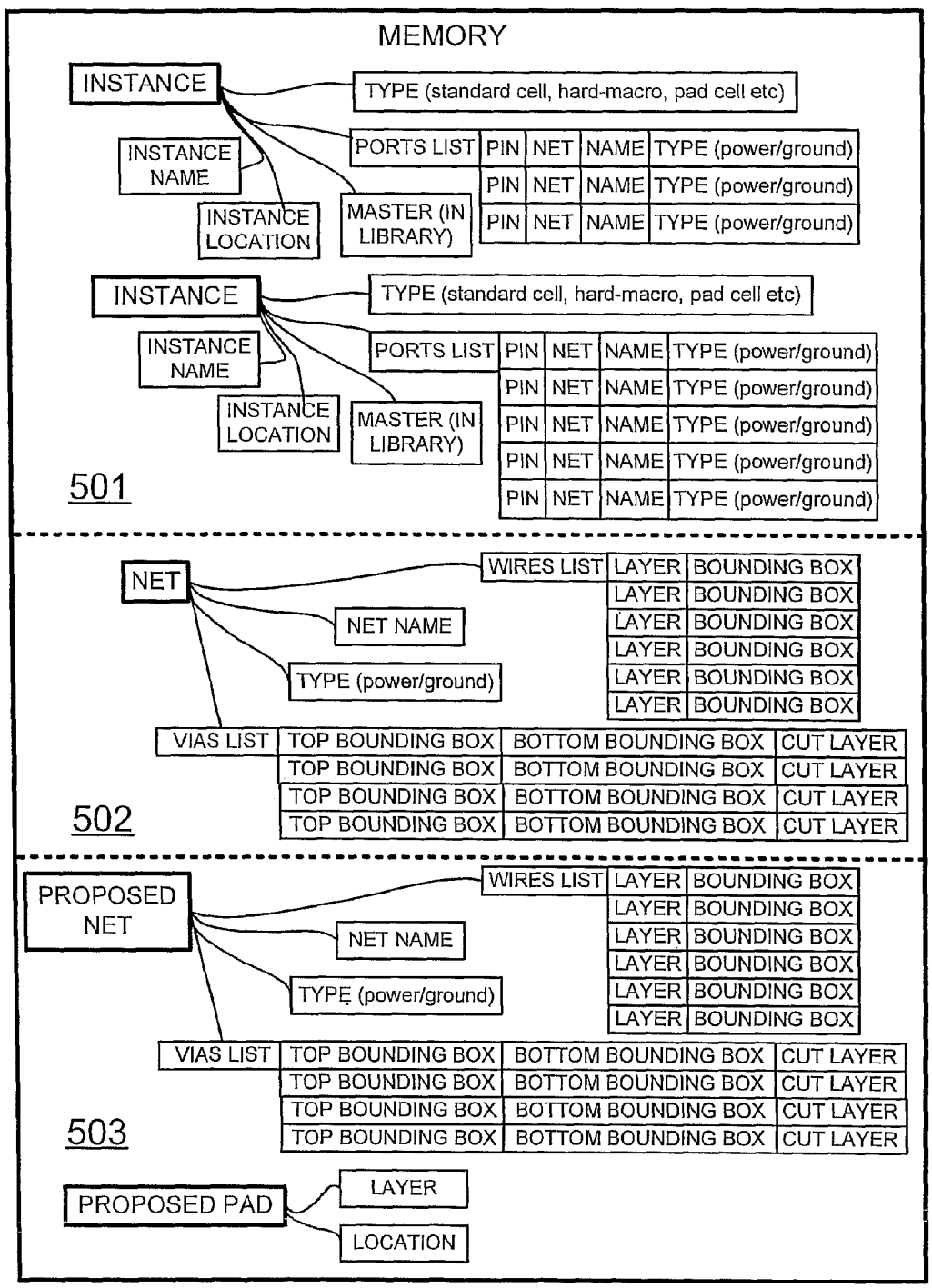
FIG. 5B illustrates, in a block diagram, data structures in the memory of the computer of FIGS. 5A and 5C prior to performing the method of FIG. 1A, in the exemplary implementation.

Only if the user has not provided any library, then act 1302 (FIG. 3A) is performed as follows. A total power budget for the entire design is received from the user (e.g. through a graphical user interface as shown in FIG. 5A). The computer then assigns power to each instance in the design, based on an aerial ratio. The aerial ratio is obtained by adding up the area of all instances, and using the total to divide an area of the instance (for which the power is being calculated). This aerial ratio is then multiplied by the total power budget for the entire circuitry, to obtain the power of the instance.

Next, as per act 1303, the current of each instance is computed by dividing the power assigned to each instance by the supply voltage. A supply voltage for the power network being analyzed (e.g. 1.5 volt) is received from the user (e.g. through a graphical user interface as shown in FIG. 5A). Thereafter, in some embodiments, in case of a standard cell, the computed current is assigned to whichever pin is the largest pin as noted above. In such embodiments, in case of a hard-macro cell, the current consumed by the entire hard macro cell is divided by the number of pins and assigned equally to each pin, unless the current per pin is predetermined (e.g. indicated in the database). For example, if the current of a hard macro cell is I and the number of pins is n, then each pin is assigned I/n current as default.

Several embodiments in accordance with the invention compute current based on virtual grid regions as per acts 1311-1313 as illustrated in FIG. 3A and described next. Specifically, as per act 1311 in FIG. 3A, the computer is programmed to find each point at which a power wire intersects with another power wire, and add the intersection point to a store of such points. While such points can be maintained in any data structure (such as an array or a linked list) well known in the art, in some embodiments a tree data structure called "KD tree" is used. While any KD tree structure known in the art may be used to store the points, some embodiments use KD tree structures of four dimensions as described in detail in the pseudo-code in the attached CD-ROM appendix. Other embodiments may use structures described in for example, an article by Bentley, J. Friedman, J. entitled "Data Structure for Range Searching", Computing Survey, Vol. 11, No 4, December 1979 which is incorporated by reference herein in its entirety.

Also, as per act 1312 (FIG. 3A), the computer is programmed to construct a rectangle around each intersection point. Note that such a rectangle (e.g. rectangle 1104 or 1119 in FIG. 1B) is also referred to herein as forming a virtual grid region. The rectangle extends half way towards each wire (which is the nearest wire) in each of four directions: up, down, left and right. Note that the nearest wire from an intersection point 1101 (FIG. 1B) can be at four different distances in the four different directions, depending on the circuitry location. In embodiments where a nearest wire can't be found, the boundary of the design is treated as the nearest wire's location (and hence a rectangle that extends half way to the boundary is used in computation of the current).

Moreover, as per act 1313, the computer is programmed to use virtual grid regions (i.e. rectangles) to assign to each intersection point a summation of current of all standard cells and hard-macro cells in an neighborhood of a virtual grid point (at the center of the rectangle). Note that the above-described KD tree storage provides a quick and easy interface to find all standard cells and other circuitry contained within a given rectangle. Therefore computing the current to be assigned to the intersection point happens very quickly when using KD tree storage.

Several embodiments in accordance with the invention also compute current based on intersection detection of wires and vias as per acts 1321-1322 as illustrated in FIG. 3A and described next. Specifically, as per act 1321 in FIG. 3A, the computer is programmed to find each point at which a power wire intersects with a pin of the circuitry. Note that such points form "connection" points at which the circuitry is connected to the power wire. Note that, for purposes of determining intersections, the specific layers in which the two items are present is not taken into account, because vias can be added therebetween during power routing and/or when committing a power plan. The computer is further programmed to add such an intersection point to the above-described store of points. Also, as per act 1322, the computer is programmed to assign each pin's current to the intersection point.

The computer is also programmed (as per act 1370 in FIG. 3A) to reduce from each intersection point the current of any circuitry that is located wholly within the above-described rectangle around this point and that has a pin connected to a power wire. This reduction is needed to avoid double counting. Specifically, the current of such circuitry has been allocated twice, namely to (1) a connection point and (2) a virtual grid point, and this double counting is remedied in this act, by deducting current from the current that is assigned to virtual grid points.

Acts 1321 and 1322 are repeated, for each of a number of different types of circuitry, such as the pins of a standard cell (acts 1331 and 1332), pins of a hard macro (acts 1341 and 1342), pins of a power cell (acts 1351 and 1352), and pins of a pad (acts 1361 and 1362) as illustrated by FIG. 3B which is discussed next. Specifically, in act 1331, the computer finds each intersection of a power wire with the largest pin of a standard cell and adds the intersection point (which is a connection point of the standard cell's largest pin to the power network) to a store of points. Note that any standard cells with largest pins that do not intersect with a power wire will not yield connection points. In act 1332, the computer also assigns the largest pin's current from the standard cell to the just-described connection point. Note that the largest pin is used for current computation because in typical designs only the largest pin is connected to the power network.

Acts 1341 and 1342 are similar or identical to the corresponding acts 1331 and 1332 except for the following difference. In the case of a standard cell, in acts 1331 and 1332, nothing is done if a pin of the standard cell doesn't intersect with a power wire, but in case of a hard macro, an extra act is performed as follows. If no intersection happens in act 1341, then the computer is programmed to find a single nearest wire to the pin, in one of the four directions, and create a temporary connection to that nearest wire, and add a temporary connection point to the store of points. Note that the temporary connection point ensures that the power is appropriately distributed in case of a hard macro.

In act 1351, the computer is programmed to find each point at which a wire and a power cell (or ground cell) intersect, and add a connection point to the store of points. The power cell (and ground cell) is a cell in which power is received from (or transferred to) an external source, e.g. through a power pad. Thereafter, the computer is programmed to add such a connection point (resulting from intersection of the power/ground cell with the power wire) to the store of points. Moreover, the connection point is marked, in act 1352, as a voltage source from which power is supplied.

Acts 1361 and 1362 are similar to the respective acts 1351 and 1352 except that these acts are performed for certain kinds of shapes that are for proposed pads. Note that proposed pads may be added by a user, e.g. during power planning, and are treated identical to power and ground cells that are otherwise normally present in the integrated circuit (IC) design. Proposed pads (e.g. see data 503 in FIG. 5B) may also be generated by a power pad synthesizer of the type described in U.S. patent application Ser. No. 10/976,719 now U.S. Pat. No. 7,536,658. Moreover, proposed wires (e.g. see data 503) may be generated by a power network synthesizer of the type described in U.S. patent application Ser. No. 10/976,411 now U.S. Pat. No. 7,353,490. A power network analyzer of the type described herein treats all pads and wires (regardless of whether preexisting or proposed) in the same manner when analyzing a power plan in the manner described herein.

Some embodiments of a programmed computer search for connected power wires (as per act 1401 in FIG. 4A), followed by checking if all power pads have been visited (as per act 1402) and if not repeating the search with any unvisited power pads. When all power pads have been visited, one or more matrix equations are solved in act 1403 (the number being solved depends on the number of connected sets, which in turn depends on the number of iterations between acts 1402 and 1401).

Figure 4B:
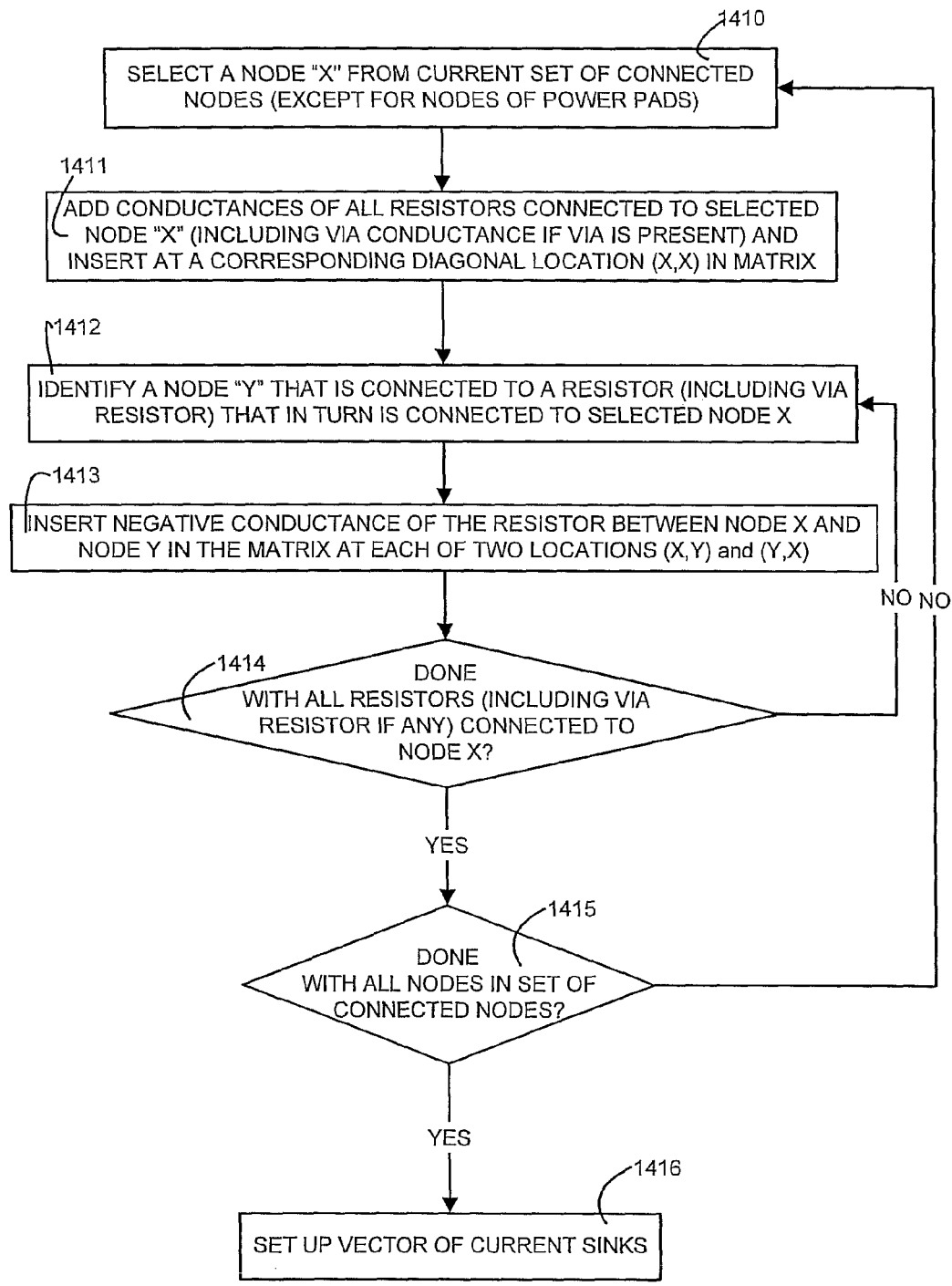

A conductance matrix is set up in some embodiments by performing acts 1410-1416 illustrated in FIG. 4B, based on a resistance model of the type illustrated in FIG. 1F. Specifically, a node (hereinafter labeled "X") is selected as per act 1410 from among nodes in a set of connected power wires, except that power pads are not selected. In the embodiments illustrated in FIGS. 1F and 1G, nodes are located on power wires, wherever the power wire is segmented, or where the power wire terminates. Next, as per act 1411, conductances of all resistors that are connected to the selected node X are added up, including the conductance of a via if present at the node X. For this reason, in the example illustrated in FIG. 1F, if node N1 is selected as node X, then the conductance at node N1 is computed as the sum $(1/R1)+(1/R2)+(1/R3)+(1/R4)+(1/R5)$. This sum of conductances is placed at a diagonal location for the node, in a conductance matrix that is being prepared.

Figure 4C:
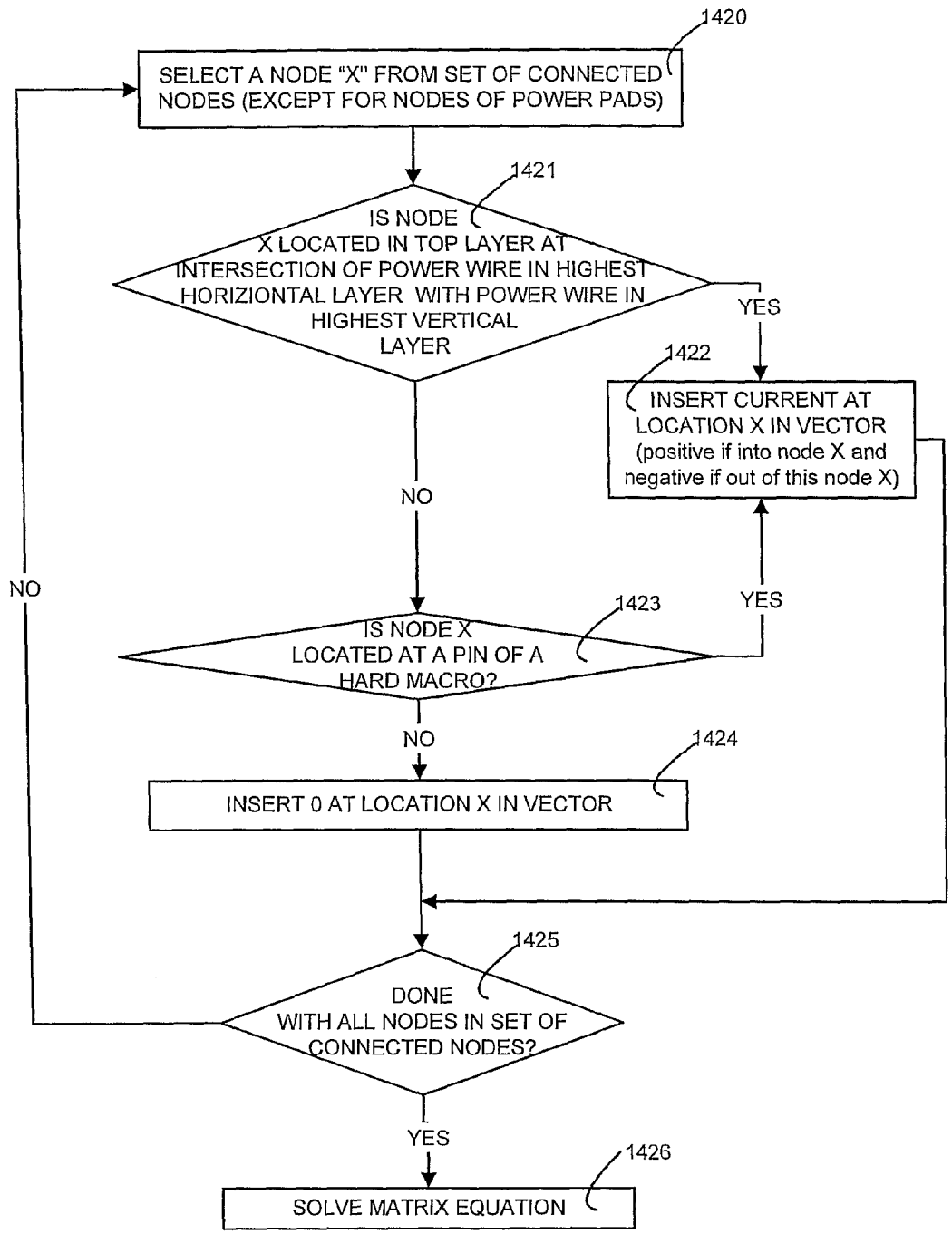

Next, each node Y that is connected to node X is identified in act 1412, and a negative conductance of a resistor between X and Y is inserted in the conductance matrix, at each of two locations (X,Y) and (Y,X) as per act 1413. If all such nodes Y that are connected to X have not been processed then control returns to act 1412, else control transfers to act 1415 to check if all nodes X have been processed. If so, then act 1416 is performed to set up a vector of current sinks as illustrated in FIG. 4C. If the answer is no in act 1415, then control returns to act 1410 to finish setting up the conductance matrix.

An illustrative conductance matrix for the resistance network shown in FIG. 1G is as follows.

$$\begin{bmatrix} \frac{1}{R1}+\frac{1}{R2}+\frac{1}{R3} & -\frac{1}{R2} & -\frac{1}{R3} & 0 & 0 \\ -\frac{1}{R2} & \frac{1}{R2}+\frac{1}{R4}+\frac{1}{R5} & 0 & -\frac{1}{R4} & -\frac{1}{R5} \\ -\frac{1}{R3} & 0 & \frac{1}{R3} & 0 & 0 \\ 0 & -\frac{1}{R4} & 0 & \frac{1}{R4} & 0 \\ 0 & -\frac{1}{R5} & 0 & 0 & \frac{1}{R5} \end{bmatrix}$$

$$\begin{bmatrix} V1 \\ V2 \\ V3 \\ V4 \\ V5 \end{bmatrix} = \begin{bmatrix} -I_{sink} \\ 0 \\ -I_{macro} \\ 0 \\ 0 \end{bmatrix}$$

A programmed computer in accordance with the invention sets up a current vector in some embodiments as per acts 1420-1426 as discussed next. Specifically, in act 1420, a node X is selected, and in act 1421 a check is made whether this node is in the topmost layer, at an intersection between a power wire in the highest horizontal layer and a power wire in a highest vertical layer If so, then act 1422 is performed to insert the current at node X into the current vector (with positive value being used if the current is entering node X and negative value if the current is leaving node X). Next, act 1425 is performed to check if all nodes in the set of connected nodes have been visited and if not then control returns to act 1420. If the answer in act 1421 is no then a check is made in act 1423 whether node X is at the location of a pin of a hard macro cell and if so act 1422 is performed. If not, then the value 0 is inserted into the location for node X in the current vector, as per act 1424 after which control transfers to act 1425. After the current vector is set up, then as per act 1426 the matrix equation is solved, e.g. by inverting the conductance matrix and multiplying by the current vector. Note that any conventional software may be used to solve such a matrix equation, although a Yale Sparse Matrix Package is used in some embodiments.

Some embodiments in accordance with the invention display a graphical user interface (GUI) of the type illustrated in FIG. 5A, which has the following fields.

| | |
|---|---|
| P/G Nets | // nets to be analyzed |
| Power Budget(mW): | // estimated power budget for the given design |
| Supply Voltage(V): | // supply voltage used for a given design |
| P/G Pad Info: | // existing power pads to be honored. |
| Read Design Pad File: | // power pads(names) file specified by user |
| Select Pad Masters: | // set power pad masters(names) in the design |

Note that the GUI also allows the user to specify a power consumption file (e.g. to identify power distribution of a hard macro) towards the bottom of the screen. Moreover, the user may also specify an output directory to keep all files generated when power pad synthesis is completed. For example, the final voltage drop display files and a report file showing pad synthesis status are stored in this directory. Note that a hierarchical option is used when the design contains hierarchical blocks. The power wires may be inside the hierarchical blocks. If that is the case, flatten option propagates the power wire to the top level so that an analysis of the type described herein (to compute the voltage drop) will contain the wires inside the block. Top level only option performs the analysis on top level power wires.

Figure 6:
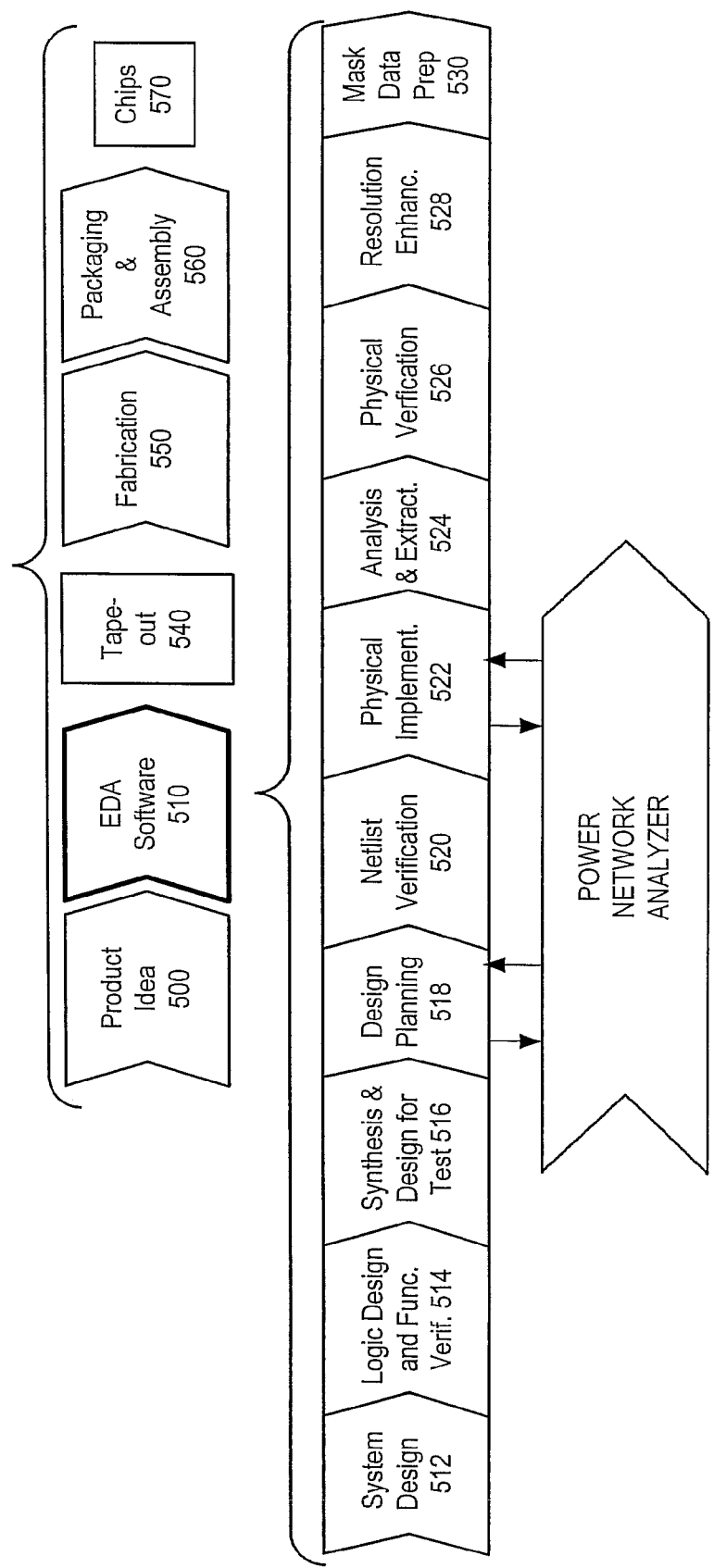
FIG. 6 illustrates, a simplified representation of an exemplary digital ASIC design flow in accordance with the invention.

It may be helpful to place this process in context. FIG. 6 shows a simplified representation of an exemplary digital ASIC design flow. At a high level, the process starts with the product idea (500) and is realized in a EDA software design process (510). When the design is finalized, it can be taped-out (event 540). After tape out, the fabrication process (550) and packaging and assembly processes (560) occur resulting, ultimately, in finished chips (result 570).

The EDA software design process (510) is actually composed of a number of stages 512-530, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC. A brief description of the components of the EDA software design process (stage 510) will now be provided.

Figure 5C:
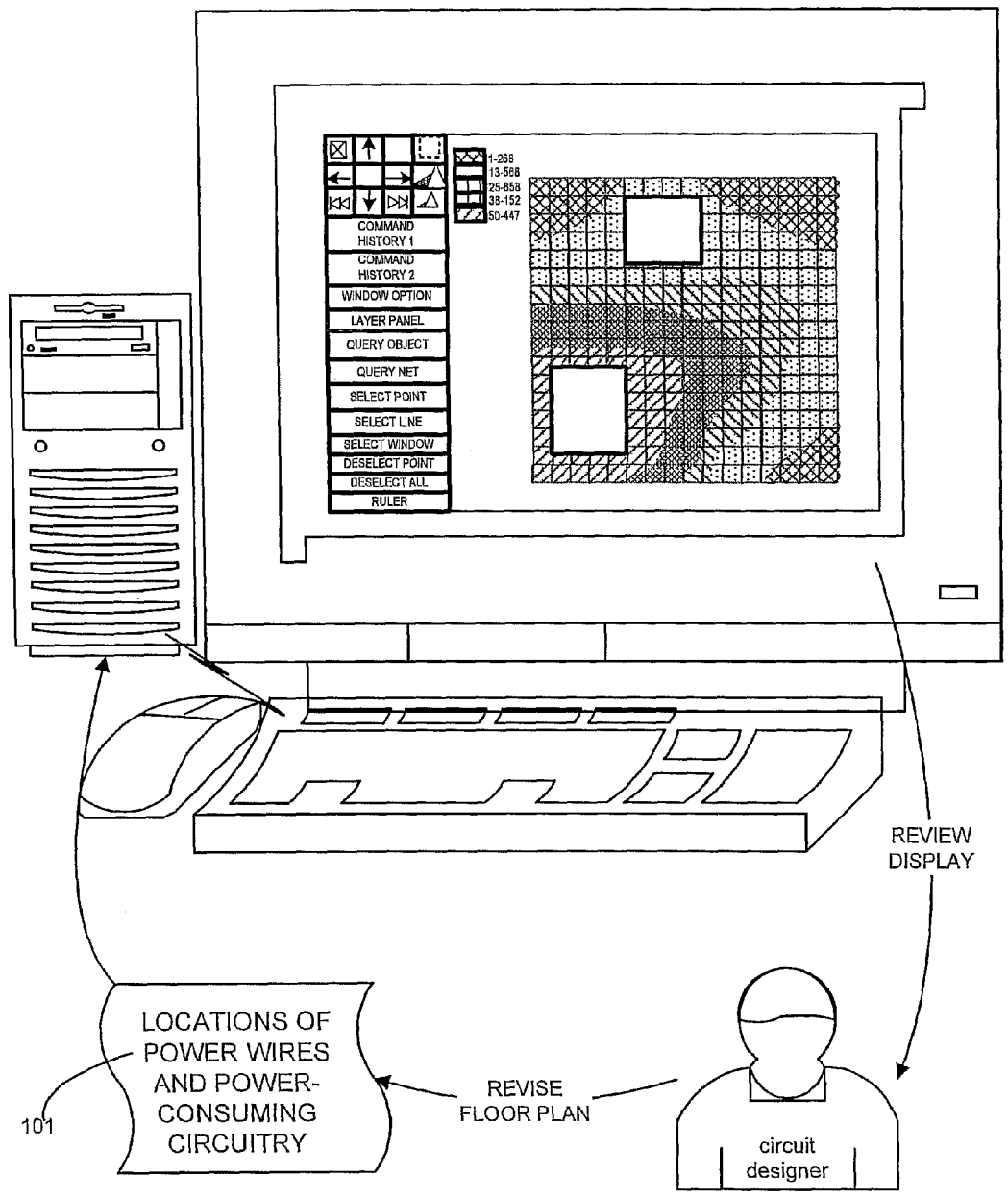
FIG. 5C illustrates, in a block diagram, the computer of FIGS. 5B and 5A displaying results in the exemplary implementation to a human, including a display of locations of two hard macro cells at the top center and bottom left corner of the display.

System design (stage 512): The circuit designers (FIG. 5C) describe the functionality that they want to implement, they can perform what-if planning to refine functionality, check costs, etc. Hardware-software architecture partitioning can occur at this stage. Exemplary EDA software products from Synopsys, Inc. that can be used at this stage include Model Architect, Saber, System Studio, and DesignWare® products.

Logic design and functional verification (stage 514): At this stage, the VHDL or Verilog code for modules in the system is written and the design (which may be of mixed clock domains) is checked for functional accuracy. More specifically, does the design as checked to ensure that produces the correct outputs. Exemplary EDA software products from Synopsys, Inc. that can be used at this stage include VCS, VERA, DesignWare®, Magellan, Formality, ESP and LEDA products.

Synthesis and design for test (stage 516): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this stage include Design Compiler®, Physical Compiler, Test Compiler, Power Compiler, FPGA Compiler, Tetramax, and DesignWare® products.

Design planning (stage 518): Here, an overall floorplan for the chip is constructed and analyzed for timing and top-level routing. Exemplary EDA software products from Synopsys, Inc. that can be used at this stage include Jupiter and Flooplan Compiler products. Note that various acts of the type described above in reference to FIG. 1 are performed in stage 518 of some embodiments. Hence, although circuitry and portions thereof (such as standard cells) are described herein as if they exist in the real world, it is to be understood that at this stage only a computer model exists in a programmed computer (FIG. 4A). The actual circuitry in the real world is created after this stage as discussed next.

Netlist verification (stage 520): At this step, the netlist is checked for compliance with timing constraints and for correspondence with the VHDL/Verilog source code. Exemplary EDA software products from Synopsys, Inc. that can be used at this stage include VCS, VERA, Formality and PrimeTime products.

Physical implementation (stage 522): The placement (positioning of circuit elements) and routing (connection of the same) occurs at this step. Exemplary EDA software products from Synopsys, Inc. that can be used at this stage include the Astro product.

Analysis and extraction (stage 524): At this step, the circuit function is verified at a transistor level, this in turn permits what-if refinement. Exemplary EDA software products from Synopsys, Inc. that can be used at this include Star RC/XT, Raphael, and Aurora products.

Physical verification (stage 526): At this various checking functions are performed to ensure correctness for: manufacturing, electrical issues, lithographic issues, and circuitry. Exemplary EDA software products from Synopsys, Inc. that can be used at this include the Hercules product.

Resolution enhancement (stage 528): This involves geometric manipulations of the layout to improve manufacturability of the design. Exemplary EDA software products from Synopsys, Inc. that can be used at this include iN-Phase, Proteus, and AFGen products.

Mask data preparation (stage 530): This provides the "tape-out" data for production of masks for lithographic use to produce finished chips. Exemplary EDA software products from Synopsys, Inc. that can be used at this include the CATS(R) family of products.

The data structures and software code for implementing one or more acts described in this detailed description can be stored on a computer-readable storage medium, which may be any storage device or storage medium that can store code and/or data for use by a computer system. A computer-readable storage medium includes, but is not limited to, magnetic and optical storage devices such as disk drives, magnetic tape, CDs (compact discs) and DVDs (digital versatile discs or digital video discs).

Note that a computer used in some embodiments to implement a power network analyzer of the type described herein is a Sun Workstation UltraSparc 750 MHz, with 4 GB memory or a linux workstation (based on PC) with 2.8 GHz CPU and 4 GB memory. Such a computer is programmed in some embodiments with a matrix solver called "YSMP" available at the Computer Science Library, in Stanford University, Palo Alto, Calif. This software is also described in a paper entitled Yale Sparse Matrix Package I: The Symmetric Codes, published in the International Journal for Numerical Methods in Engineering, Vol. 18, 1145-1151 (1982), which is incorporated by reference herein in its entirety.

Numerous modifications and adaptations of the embodiments described herein will become apparent to the skilled artisan in view of this disclosure.

Numerous modifications and adaptations of the embodiments described herein are encompassed by the scope of the invention.

The invention claimed is:

1. A method of analyzing a design of an integrated circuit device comprising a plurality of power wires and a plurality of power pads, the method comprising:

starting from a first power pad, automatically identifying, from among the plurality of power wires, a first set of power wires that are electrically connected to one another while eliminating from the first set any power wire in said design unconnected to said first power pad;

starting from a second power pad not visited during said automatically identifying, automatically identifying, from among the plurality of power wires, a second set of power wires that are electrically connected to one another, while eliminating from the second set any power wire in said design unconnected to said second power pad;

using at least one computer to automatically segment every power wire in each set, at least at a location of a via in the design;

automatically determining a value of at least one attribute of each wire segment identified by said using of said at least one computer; and outputting at least said value.

2. The method of claim 1 wherein said automatically determining comprises:

automatically preparing a matrix of conductances, based on vias and based on a plurality of wire segments resulting from said using at least one computer;

automatically preparing a vector of current sinks in an uppermost layer, located at least at a via, based on power consumed in neighboring circuitry; and automatically computing voltage drops at a plurality of locations by inverting said matrix and multiplying by said vector.

3. The method of claim 2 wherein:

at least a group of power pads in said plurality of power pads are located in said uppermost layer.

4. The method of claim 2 wherein:

an estimate of at least one conductance in said matrix is based on a dimension of a wire segment and sheet resistance identified in a technology file.

5. The method of claim 1 further comprising:
automatically segmenting at least one wire at each of a plurality of connections of said at least one wire to a plurality of pins of a hard macro cell;
wherein the hard macro cell is located internal to said design.

6. The method of claim 1 wherein said automatically determining comprises:
automatically estimating current through a current sink at a via, based on an assumption that all current, through a standard cell connected to said via, passes through a largest cross-section pin of said standard cell.

7. The method of claim 1 further comprising:
automatically segmenting a power wire in said group at a location adjacent to a pin of an unconnected hard macro cell if the power wire is located closest to said pin.

8. The method of claim 7 wherein said automatically determining comprises:
automatically estimating current through a current sink at said location, based on a power library for the hard macro cell, the power library being specified by a user.

9. The method of claim 8 wherein said automatically estimating comprises:
automatically dividing a total current consumed by the hard macro cell, by a number of pins of the hard macro, to obtain said current through the current sink.

10. The method of claim 9 wherein said automatically estimating further comprises:
automatically dividing a total power consumed by the hard macro cell, by a supply voltage, to obtain said total current consumed by the hard macro.

11. The method of claim 10 wherein said automatically estimating further comprises:
automatically computing an average internal power for said power library;
automatically computing an average of leakage power; and
automatically summing up said average internal power and said average of leakage power, to obtain said total power consumed by the hard macro.

12. The method of claim 7 wherein said automatically determining comprises:
if a user has not provided a library, automatically multiplying:
a total power budget for said design; and
an aerial ratio.

13. The method of claim 1 further comprising:
automatically estimating current through a current sink located at said via, based on an area of overlap of a standard cell with a rectangle surrounding said via;
wherein the rectangle is formed by a virtual grid, of lines located half-way between adjacent power wires.

14. A non-transitory computer-readable storage medium encoded with instructions to analyze a design of an integrated circuit device comprising a plurality of power wires and a plurality of power pads, the instructions comprising:
instructions, to start from a first power pad, to automatically identify, from among the plurality of power wires, a first set of power wires that are electrically connected to one another while eliminating from the first set any power wire in said design unconnected to said first power pad;
instructions, to start from a second power pad not visited during execution of said instructions to automatically identify, to automatically identify, from among the plurality of power wires, a second set of power wires that are electrically connected to one another, while eliminating from the second set any power wire in said design unconnected to said second power pad;
instructions to at least one computer to automatically segment at least one power wire in at least one set at least at a location of a via in the design;
instructions to automatically determine a value of at least one attribute of each wire segment identified by said instructions to said at least one computer; and
instructions to output at least said value.

15. The computer-readable storage medium of claim 14 further comprising instructions to:
automatically prepare a matrix of conductances, based at least on a plurality of wire segments resulting from execution of said instructions to at least one computer;
automatically prepare a vector of current sinks based on power consumed in neighboring circuitry; and
automatically compute voltage drops by inverting said matrix and multiplying by said vector.

16. The computer-readable storage medium of claim 14 further comprising instructions to:
automatically segment at least one wire at each of a plurality of connections of said at least one wire to a plurality of pins of a hard macro cell;
wherein the hard macro cell is located internal to said design.

17. The computer-readable storage medium of claim 14 further comprising instructions to:
automatically segment a power wire in said group at a location adjacent to a pin of an unconnected hard macro cell if the power wire is located closest to said pin.

18. The computer-readable storage medium of claim 14 further comprising instructions to:
automatically estimate current through a current sink, based on an area of overlap of a standard cell with a rectangle;
wherein the rectangle is formed by a virtual grid, of lines located half-way between adjacent power wires.

19. An apparatus for analyzing a design of an integrated circuit device comprising a plurality of power wires and a plurality of power pads, the method being performed in a computer, the apparatus comprising:
first means for starting from a first power pad, for automatically identifying, from among the plurality of power wires, a first set of power wires that are electrically connected to one another while eliminating from the first set any power wire in said design unconnected to said first power pad;
second means for starting from a second power pad not visited by said first means, for automatically identifying, from among the plurality of power wires, a second set of power wires that are electrically connected to one another, while eliminating from the second set any power wire in said design unconnected to said second power pad;
means for automatically segmenting every power wire in each set at least at location of a via in the design;
means for automatically determining a value of at least one attribute of each wire segment identified by said automatically segmenting; and
means for outputting at least said value.

20. The apparatus of claim 19 wherein said means for automatically determining comprises:

means for automatically preparing a matrix of conductances, based on vias and based on a plurality of wire segments resulting from said automatically segmenting;

means for automatically preparing a vector of current sinks in an uppermost layer, located at least at a via, based on power consumed in neighboring circuitry; and means for automatically computing voltage drops at each location of said automatic segmenting by inverting said matrix and multiplying by said vector.

21. The apparatus of claim 19 further comprising:

means for automatically segmenting at least one wire at each of a plurality of connections of said at least one wire to a plurality of pins of a hard macro cell;

wherein the hard macro cell is located internal to said design.

* * * * *